United States Patent
Hunter et al.

(10) Patent No.: US 8,925,609 B2
(45) Date of Patent: Jan. 6, 2015

(54) SYSTEMS AND METHODS FOR PRODUCING SOLID INK LAMINATE SECURITY FEATURES

(75) Inventors: Jonathan B Hunter, Marion, NY (US); George A. Gibson, Fairport, NY (US); Linn C Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 132 days.

(21) Appl. No.: 13/586,933

(22) Filed: Aug. 16, 2012

(65) Prior Publication Data
US 2014/0048204 A1 Feb. 20, 2014

(51) Int. Cl.
*B29C 65/02* (2006.01)
*B29C 65/48* (2006.01)
*B32B 37/00* (2006.01)
*B32B 38/14* (2006.01)
*B32B 43/00* (2006.01)
*B31F 5/00* (2006.01)

(52) U.S. Cl.
USPC ............................. 156/387; 156/538; 156/556

(58) Field of Classification Search
USPC ........... 156/277, 278, 280, 308.2, 309.6, 384, 156/387, 538, 556, 580, 583.1
See application file for complete search history.

(56) References Cited

U.S. PATENT DOCUMENTS

| | | | | |
|---|---|---|---|---|
| 4,557,505 A | * | 12/1985 | Schaefer et al. | 283/81 |
| 7,108,743 B2 | * | 9/2006 | Fujiwara et al. | 106/31.48 |
| 7,389,939 B2 | * | 6/2008 | Jones et al. | 235/494 |
| 7,824,029 B2 | * | 11/2010 | Jones et al. | 347/101 |
| 2012/0120228 A1 | * | 5/2012 | Kawaguchi et al. | 348/88 |

FOREIGN PATENT DOCUMENTS

JP 2004148198 A * 5/2004 ................ B05C 5/00

OTHER PUBLICATIONS

English Abstract of JP 2004-148198 (Feb. 20, 2014).*
Machine English Translation of JP 2004-148198 (Feb. 20, 2014).*

* cited by examiner

*Primary Examiner* — Sing P Chan
(74) *Attorney, Agent, or Firm* — Ronald E. Prass, Jr.; Prass LLP

(57) ABSTRACT

A system and method are provided that employ an ink jet process to dispose a non-aqueous solid ink product on a flexible clear film layer as an image receiving substrate to create multi-layer tamper-evident closures including tape, wrapping, labeling, marking or sealing products, in which visual information is embedded. These processes provide manufacturers of the multi-layer tamper-evident closures ability to present variable image content in ways that would be difficult to counterfeit. The solid ink product undergoes easily observable image changes when it is twisted in a manner that creates a shear force between the layers.

4 Claims, 5 Drawing Sheets

SYSTEMS AND METHODS FOR PRODUCING SOLID INK LAMINATE SECURITY FEATURES

BACKGROUND

1. Field of Disclosed Subject Matter

This disclosure relates to systems and methods for producing solid ink laminate security features that may be included in tapes, wraps, labels marks or seals for product packaging to improve tamper resistance of the product packaging.

2. Related Art

Tampering, with respect to products and product packaging, generally refers to affirmative actions undertaken by individuals to modify the products and/or packaging in a manner that is intended to render the products unsuitable, unusable and/or potentially harmful to users or consumers of the products. Tampering, with regard to packaged products, takes many forms and is most effective when the package tampering goes undetected. A well-publicized case of harmful product tampering occurred in the early 1980's when seven people died after taking pain-relief medicine capsules that had been poisoned. This case led to reforms in products and product packaging for over-the-counter medications, and to the enactment of federal anti-tampering laws. See 18 U.S.C. §1365—Tampering with consumer products (making it a federal offense to tamper with or taint any consumer product, or to falsely label any consumer product, or a container for any consumer product, including any food, drug, device or cosmetic, or "any article, product, or commodity which is customarily produced or distributed for consumption by individuals, or use by individuals for purposes of personal care or in the performance of services ordinarily rendered within the household, and which is designed to be consumed or expended in the course of such consumption or use"). Dangers that are generally associated with the most severe instances of tampering include, but are not limited to, death, physical pain, disfigurement, illness, and loss or impairment of the function of a bodily member, organ, or mental faculty. For companies, injury may manifest itself in the form of significant economic loss based simply on a suspicion that a company's products are unsafe as having been subjected to tampering. The economic loss may include an amount of stock for a particular product that needs to be replaced and destroyed, particularly when it is impossible to tell if any particular single item has been tampered with. The economic loss may be further predicated on a general fear on the part of the consuming public when assurances cannot be provided that the company's products are "safe."

In view of the potentially devastating effects of tampering in the form of actual injury or economic loss, companies expend significant efforts in guarding against tampering with measures that seek to (1) make actual tampering with regard to individual products more difficult, and (2) provide product and packaging designs that provide recognizable indications of tampering as a warning to a user or a consumer.

It is generally recognized that it is virtually impossible to render products or product packages that are available to the general public in the consumer marketplace "tamper-proof." Products, and packaging for products, can, however, generally be made tamper resistant to those having access to the product or product packaging. Tamper resistance, as it applies to products and product packaging, takes many forms as devices or features that are added to the products themselves, or to the products' packaging, to deter product tampering. These devices or features may include one or more of (1) packaging that is composed of multiple layers, (2) packaging that, by its composition, is regarded as extra-strong and/or extra-secure, and (3) packaging that cannot be resealed providing evidence that it has been unsealed.

In many applications including those referred to above, the deterrent effect may be provided not strictly based on any capacity to thwart actual tampering, but rather on the knowledge that evidence of any tampering or attempted tampering will be indicated by the product or packaging. In this regard, certain of the devices and features that are included to make products and product packaging tamper-resistant may be generally more appropriately characterized as devices and features that make the products and the product packaging "tamper-evident."

Tamper-evident devices and features include tapes, wraps, labels, marks and seals that constitute perhaps the most prevalent and visible form of tamper resistance for products and product containers that are familiar to the general public. These tamper-evident devices and features are generally applied to products and product containers where it can be particularly important to know that a particular product has not been altered since the product left the manufacturer or packager.

Tamper-evident packaging takes many forms, many of which may be circumvented. Jarred food items are often packaged with metal bubble-top "safety button" lids that pop up when the jar is opened. An unpopped "safety button," therefore, should indicate that the jar has never been opened. Presumably, the seal was achieved by packaging the jars in a low-pressure atmosphere, albeit that details of the sealing procedures were generally guarded as companies' trade secrets. It has, however, been publicly demonstrated that these tamper-evident jar lids can be reclosed with their seals appearing to have been undisturbed. Based on such demonstrations, a need arose for additional tamper-evident closures that could be applied to a broader cross-section of typical containers. A plastic wrap or tape emerged that was typically "shrink-wrapped" with the application of heat around the edge of the lid to be removed when the lid is opened the first time. These wraps or tapes are often, however, able to be removed and replaced with a careful application of heat during an intentional unsealing and resealing process that is designed to tamper with the product and to hide any evidence of the tampering.

SUMMARY OF THE DISCLOSED EMBODIMENTS

Tamper-evident packaging today comes in the form of increasingly sophisticated tapes, wraps, labels, marks and seals. Some of these materials are designed to easily tear if removed. Packaging that tears open raggedly or otherwise cannot be resealed is usable to help indicate tampering. Many tamper evident packages include induction sealing and other special means to help provide evidence of tampering. Breakaway components that cannot be reattached are often used.

An objective of all of these devices and features is to provide a level of added protection against tampering, but moreover to provide end-users and consumers with a relatively easy means to detect signs of tampering with respect to a typical package opening and with respect to the package as a whole.

Product tampering and security remain serious concerns in the consumer marketplace, as well as in industrial supply chains. The above-described methods are examples of the large number of schemes that have been developed to help protect suppliers and consumers. The above-described methods may be further supplemented with holograms, secure track and trace schemes, UV and IR visualizable encoded print or images, and the like. As discussed, these approaches have varying strengths and weaknesses, including generally that some may be circumvented, while others that are widely used may be easily counterfeited, particularly when they include generally fixed image information.

In view of the above shortfalls in current tamper-resistant and tamper-evident tapes, wraps, labels, marks and seals, it would be advantageous to implement an increasingly sophisticated scheme for producing tamper-evident tapes, wraps, labels, marks and seals according to a method that provides easily-recognizable evidence of tampering in a tape, wrap, label, mark or seal that cannot be counterfeited in a manner that would conceal the evidence of tampering.

Exemplary embodiments of the disclosed systems and methods may provide a more sophisticated tamper evident tape, wrap, label, mark and/or seal that is relatively simple to produce and that achieves the above objectives.

Exemplary embodiments may provide a solid ink image, printed between at least two layers of flexible packaging material that display properties for use as tamper-evident security measures. The exemplary laminated structure may undergo easily-observable image changes when it is twisted in a manner that creates a shear force between the layers of the laminated structure.

Exemplary embodiments may employ digital super-fine ink jet printing to produce a solid ink image to be disposed between at least two layers of flexible package material to customize the solid ink image in a manner to avoid counterfeiting by making the counterfeiting process more difficult and costly.

Exemplary embodiments may provide improvements on current solid ink technology labeling for safety and security purposes. Polymeric flexible packages and tapes may be formed in multiple layers to "sandwich" a solid ink image that tends to be very fragile and, when exposed on an outer surface of an uncoated film, may be relatively easily removed by scratching or rubbing, in spite of being relatively robust when printed on the substrate.

Exemplary embodiments may encapsulate a solid ink image between at least two polymeric layers. The final packaging may supplement a base film by laminating a second film onto the base film and a disposed solid ink image, the second film may or may not be of the same composition as the base film.

Exemplary embodiments may employ a bi-axially oriented polypropylene film coated on one side with an adhesive, which may be at least one of an acrylic adhesive or an adhesive that is heat activatable. The exemplary embodiments may use a direct-to-film modified super-fine ink jet printer to image a portion of one film layer. A second film layer may be laminated on the imaged film layer creating an ink image interposed between the two film layers.

Exemplary embodiments may produce a composite layered or laminated packaging with resultant images having a high gloss surface, reflecting the optical properties of the encapsulating films. The encapsulated images may not be removable from the surfaces of the packaging due to the encapsulating that provides the low shear resistant layer in the sandwiched composite. In exemplary embodiments, twisting or bending in a manner that creates a shear force between top and bottom encapsulating film layers may likely cause fracture of the solid ink image with a resultant dramatic change in the apparent gloss uniformity in appearance of the composite layered or laminated packaging.

Exemplary films may be employed as tamper-evident closures, or as components of tamper-evident closures, including tapes, wraps, labels, marks and seals usable to detect attempts to access a product or product container. The exemplary films may include pictorial or textual images that may be varied, even to a level of individual object uniqueness, thereby making them more difficult to counterfeit.

Exemplary films may be applied as shrink-wrapped banding around twist off lids on food jars, plastic bottles and the like. An ability to remove the lid without breaking the shrink wrap and to carefully replace the lid without evidence of tampering may be thwarted with the use of the disclosed exemplary films in that a resultant strain of stretching the band would fracture the fragile encapsulated image to change the color and/or appearance of the band providing a more precise evidence of tampering or attempted tampering.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for producing solid ink laminate security features will be described, in detail, with reference to the following drawings, in which.

DETAILED DESCRIPTION OF THE DISCLOSED EMBODIMENTS

Figure 1:
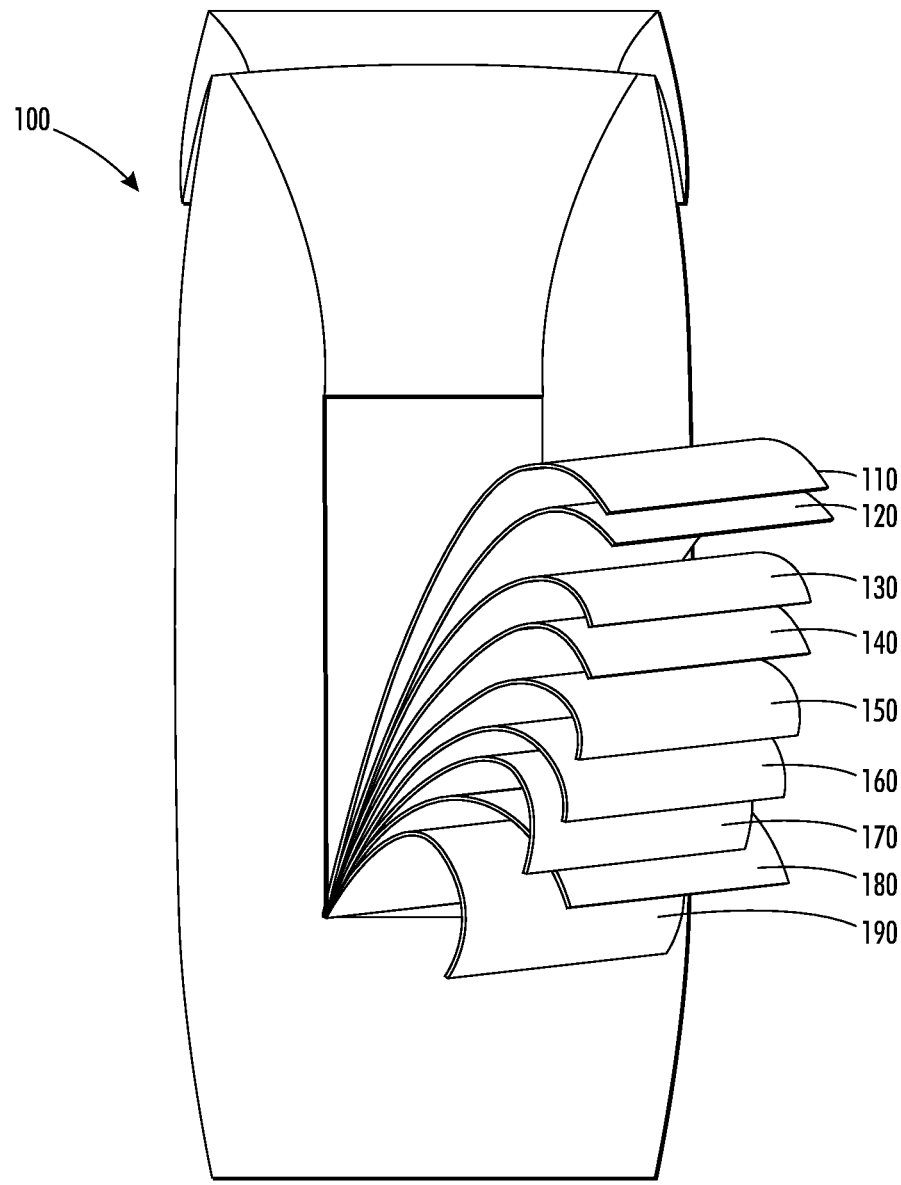
FIG. 1 illustrates an exemplary packaging that is usable with the systems and methods according to this disclosure.

The systems and methods for producing solid ink laminate security features, including a laminated structure for a tamper-evident tape, wrap, label, mark or seal, as described in this disclosure, will generally refer to this specific utility or function for those systems and methods. Exemplary embodiments described and depicted in this disclosure should not be interpreted as being specifically limited to any particular configuration of the described elements, any specific configuration of a resultant flexible laminated structure, or any limiting configuration of an encapsulated solid ink image in a laminated structure, or as being specifically limited to any particular function or intended use. Any advantageous combination of the disclosed features, which may produce improved tamper-evident packaging, tapes, wraps, labels, marks, seals, or the like that may benefit from employing components of the described systems and methods for producing solid ink images encapsulated in laminated film structures, are contemplated as being included in this disclosure.

Specific references may be made to, for example, any image forming device that is usable to form solid ink images on various flexible films. These references should not be viewed as limiting the subject matter of this disclosure. Use of the terms makes non-limiting reference to common electronic and image forming devices, including ink jet printers with a printing capability for producing solid ink images on various image receiving media substrates. The disclosed systems and methods will be described as being particularly adaptable to super-fine ink jet printing, but should not be construed as being limited to this method of solid or non-aqueous ink image formation on a substrate.

Solid ink can be printed by a number of methods, including by transfer or by direct-to-film processes, onto a variety of films including such films as may generally be used in flexible packaging. In general, resultant solid ink images deposited on uncoated and/or rough plastic films tend to be very shear sensitive. This characteristic yields an advantage in that the solid ink image more easily shows signs of having been disturbed than do previous conventionally printed images. This advantage is balanced by a disadvantage in that resultant solid ink images on the exposed surfaces of such films can be inadvertently disturbed by non-deliberate contact, or otherwise may be relatively easily removed altogether by deliberate acts, such as scratching or rubbing the images.

Typical polymeric flexible packages generally consist of a multi-layer "sandwich" construction with ink images encapsulated between at least two polymeric film layers. The polymeric film layers are coated on their surfaces that are intended to mate with other layers with adhesives, typically adhesives that can be heat activated. One of the films may be printed by, for example, as offset lithographic or a flexographic printing process. The final packaging base (printed) film may then be covered by laminating with a second film that may or may not be of a same composition.

FIG. 1 illustrates an exemplary packaging 100, according to the composition described above, that may be usable with the systems and methods according to this disclosure. The exemplary packaging 100, as is shown in the cutaway portion, may consist of several layers. In this example, the layers may comprise the following: a low-density polyethylene inner layer 110; a first adherent resin layer 120; an aluminum foil layer 130; a low-density polyethylene intermediate layer 140; a raw paper layer 150; a second adherent resin layer 160; a metalized polyethylene terephthalate (PET) layer 170; an inked layer 180; and a low-density polyethylene outer layer 190. This is but one example of a complex series of complementing layers that may constitute an exemplary packaging 100. Many different, and more complex or more simplified, combinations of layers may be used depending on characteristics of a product contained in the exemplary packaging and required characteristics of the packaging.

It should be noted that, given the conventional printing processes that are currently employed to render the images in, for example, the inked layer 180 of the exemplary packaging 100, the individual images are static and flex with the packaging. This is generally important to manufacturers such that the packaging design details are repeatable and the aesthetically pleasing nature of the packaging is not disturbed.

With regard to current technologies in purportedly tamper-evident bands, in which the bands are printed with some labeling to make them less generic, i.e., not simply a plain plastic closure, the printed labeling is fixed. This is principally the case because there are no digital devices in use today directed at such security applications. Further, any attempt to apply, for example, what is considered to be the dominant ink jet technology would require very special, and very costly, materials to make the print process work at all.

The systems and methods according to this disclosure may employ an ink jet process to dispose a novel non-aqueous solid ink product on a flexible clear film layer as an image receiving substrate to create multi-layer tamper-evident closures including tape, wrapping, labeling, marking or sealing products, in which visual information is embedded. These processes may provide manufacturers of the multi-layer tamper-evident closures an ability to present variable image content in ways that would be difficult to counterfeit. These processes may further provide manufacturers of the multi-layer tamper-evident closures a capability to coordinate the variable image content of the multi-layer tamper-evident closures with the images that are contained in the labeling or marking of a particular product's package. In this manner, presence of the multi-layer tamper-evident closure may be partially hidden as it may be designed to blend with background packaging images. Such blending of the multi-layer tamper-evident closure with the background package images has the additional advantage of not disrupting the aesthetically pleasing nature of the product package, which may be important to the product manufacturer.

The disclosed systems and methods may provide an enhanced security capacity without significant increases in cost to product manufacturers and packagers.

A non-aqueous solid ink jet technology may be employed to form images on adhesive-coated plastic film substrates, including substrates of oriented polypropylene, which are already used in flexible packaging applications. The non-aqueous solid ink images are encapsulated between at least two adhesive coated plastic film substrate layers yielding a structure that includes at least layers (in order) of plastic-adhesive-ink-adhesive-plastic. In plan view, the non-aqueous solid ink images may be encapsulated between the at least two adhesive coated plastic film substrate layers in a manner that the imaged area may be surrounded by non-imaged areas in order to promote adhesion between the at least two adhesive-coated plastic film substrates to fully encapsulate the non-aqueous solid ink image. As such, it is preferable to have a "clear" area of at least a couple of mils surrounding the imaged area of the structure.

Based on the materials used, and the composition of the structure, the application of torsional stress to the structure required to open the package may cause the structure to fracture primarily at an ink-adhesive interface, but also within the ink interface itself. These fractures create a discontinuity in a refractive index of the structure, which shows up as, for example, a visual greying of the inked image. In this manner, the application of stress to open the structure will result in significant visual degradation to the ink image in a manner that is predictable. A difference in adhesion between layers in the imaged and non-imaged areas of the structure, as viewed in plan view, will enhance both the occurrence and the clarity of the visual degradation in the area of the visual image.

Exemplary composite laminated structure samples were made using bi-axially oriented polypropylene film layers coated on one side with an adhesive as can be found commercially available as flexible packaging films. Employing a direct-to-film modified super-fine ink jet printer, a first or base film layer was imaged on an adhesive-bearing side and laminated with a second or top film layer, with the adhesive bearing side of the second or top film layer facing the image and the adhesive bearing side of the first film layer. In this manner, an inked image interposed between two bi-axially oriented polypropylene film layers was created. A number of such composite laminated structure samples were created, and the resultant encapsulated inked images were observed to have a high gloss finish, reflecting the optical properties of the encapsulating base and top film layers.

The composite laminated structure samples were known to exhibit a certain fragility in a sense themselves. Twisting or bending in a manner that creates shear force between the base and top film layers or lamella causes (1) a clouding of the encapsulated inked image based on a different adhesion between the base and top lamella themselves and adhesion between either of the lamella and the inked image, or (2) an actual fracture of the inked image, with a resultant dramatic change in the apparent gloss uniformity of the inked image in either circumstance.

Although the exemplary composite laminated structure samples were formed with single color square inked images for ease of experimentation, and the attached drawings depict the exemplary inked image layers/portions as generally homogeneous rectangles for ease of depiction, it should be recognized that the super-fine ink jet deposition scheme may provide a near limitless opportunity to produce the inked images as multi-colored pictorial and/or textual images of any design. The use of low temperature activation adhesives is preferred for the disclosed composite laminated structure containing multi-colored pictorial and/or textual images.

Such composite laminated film structures, employed as tamper-evident packaging closures, or as components of tamper-evident packaging closures, may find utility in better detecting attempts to access the contents of the packaging with which the closures are associated. As an example, the disclosed composite laminated structures may be employed in the shrink-wrapped banding around twist off lids on food jars, plastic bottles and all manner of medicine containers. As indicated above, unaugmented shrink-wrapped banding provides a measure of security, but it is possible to remove the lid without breaking the shrink-wrapped banding. As such, the shrink-wrapped "protective" banding can be carefully replaced without evidence of tampering. Applying the disclosed composite laminated structures to the shrink-wrapped banding, by embedding the structures in, or affixing them to a surface of, the banding, would result in a protective band in which attempts at tampering without breaking the shrink-wrapped banding would produce a resultant strain from stretching the protective band that would change the color of the inked images as part of the band giving a true indication of product tampering.

Figure 2:
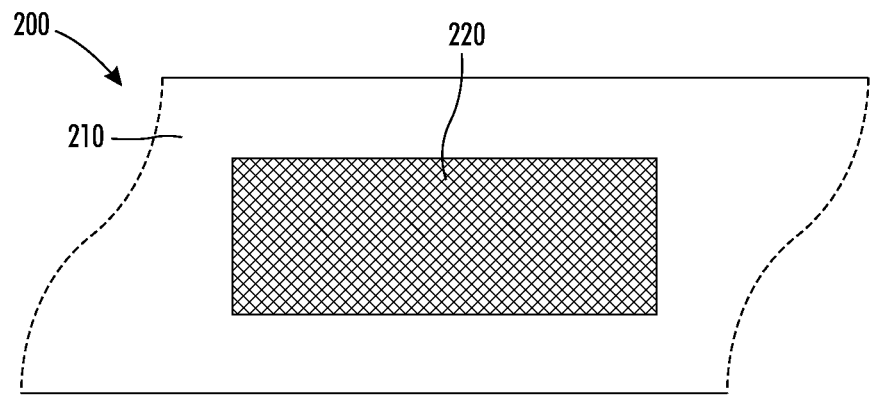
FIG. 2 illustrates a plan view of an exemplary laminated structure usable in a tamper-evident tape, wrap, label, mark or seal produced by the systems and methods according to this disclosure.

FIG. 2 illustrates a plan view of an exemplary laminated structure 200 usable in a tamper-evident tape, wrap, label, mark or seal produced by the systems and methods according to this disclosure. As shown in FIG. 2, a portion of a laminated structure 200 may be comprised of an inked image 220 interposed between two film layers 210. As discussed above, the resultant encapsulated inked image 220 will have a comparatively high gloss finish, reflecting the optical properties of the encapsulating base and top film layers 210.

Figure 3:
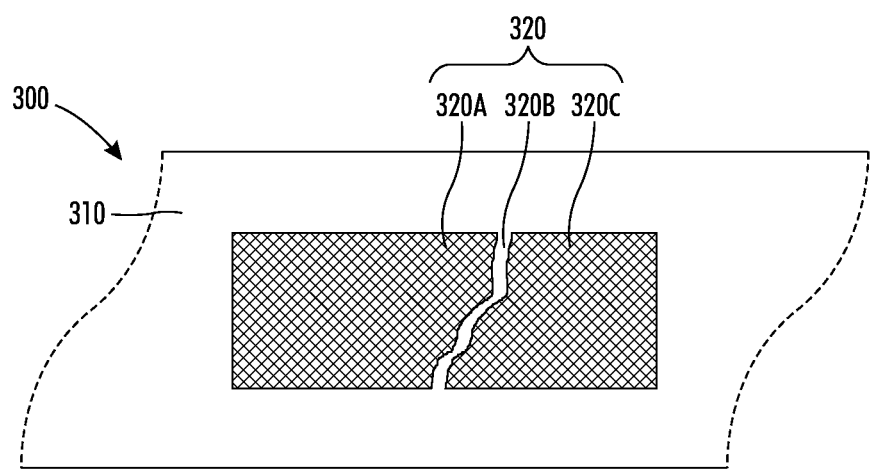
FIG. 3 illustrates a variation of the plan view of the exemplary laminated structure shown in FIG. 2 showing a fracture in a solid ink image embedded in the laminated structure usable in a tamper-evident tape, wrap, label, mark or seal produced by the systems and methods according to this disclosure.

FIG. 3 illustrates an exemplary variation 300 of the plan view of the exemplary laminated structure 200 shown in FIG. 2. As shown in FIG. 3, some twisting or bending may have been applied to the laminated structure in which an inked image 320 is interposed between two film layers 310 in a manner that has created shear force between the two film layers 310. As a result, the encapsulated inked image 320 may become cloudy, or as in this case, an actual fracture 320B of the inked image may occur separating the inked image partially, or completely (as shown), into two inked image portions 320A,320C. Any such disturbance, whether a clouding or and actual fracture, may result in an easily-perceptible change in the apparent gloss uniformity of the inked image 320.

FIGS. 4A-D illustrate an edge view of exemplary steps in the production of an exemplary laminated structure usable in a tamper-evident tape, wrap, label, mark or seal according to the systems and methods of this disclosure.

Figure 4A:
FIGS. 4A-D illustrate an edge view of exemplary steps in the production of an exemplary laminated structure usable in a tamper-evident tape, wrap, label, mark or seal according to the systems and methods of this disclosure.
Figure 4B:
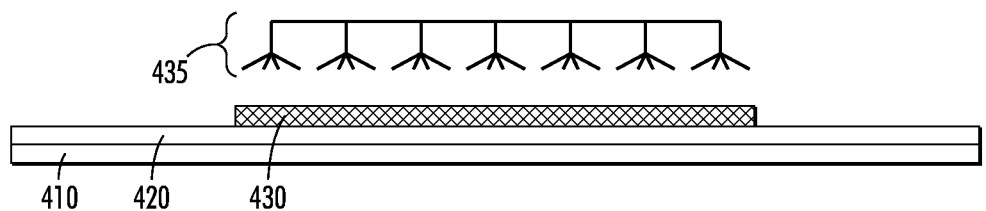
Figure 4C:
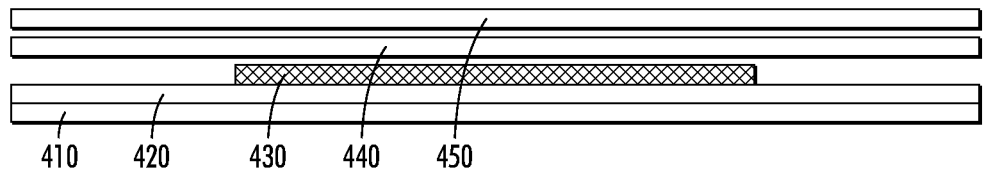
Figure 4D:
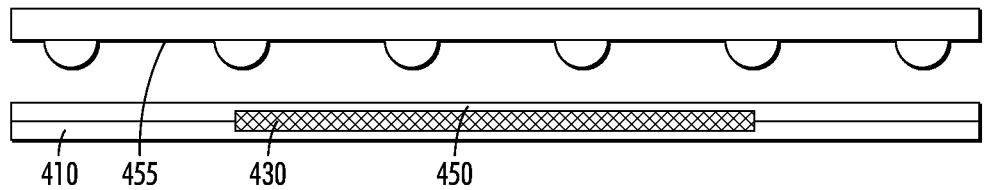

As shown in FIG. 4A, production of the exemplary laminated structure may begin by positioning a first or base film layer 410. The first or base film layer 410 may be coated on an upper side with an adhesive. Alternatively, as shown in FIG. 4B, a first separate adhesive layer 420 may be positioned on the first or base film layer 410. The adhesive, whether coated on the first or base film layer 410, or present in a first separate adhesive layer 420, may be a commercially-available, adhesive of a type normally associated with flexible packaging films. Further, as shown in FIG. 4B, an inked image layer 430 may be imaged on an adhesive bearing side of the first or base film layer 410 by depositing ink from a nozzle system 435. In embodiments, a direct-to-film modified super-fine ink jet printer may constitute the nozzle system 435 shown in FIG. 4B. FIG. 4C shows the positioning of a second or top film layer 450, with an adhesive coated on its lower side, or with a second separate adhesive layer 440 being interposed, above the inked image layer 430 and below the second or top film layer 450. FIG. 4D depicts what may be considered a final step in which heat and/or pressure may be applied by, for example, a radiation unit 455 to seal the layers of the laminated structure together in a manner that encapsulates the inked image layer 430 between adhesive-laden base and top film layers 410,450. In this manner, a laminated structure including an inked image layer 430 interposed between two film layers 410,450 is created. A resultant encapsulated inked image layer 430 may likely have a high gloss finish, reflecting the optical properties of the encapsulating base and top film layers 410,450. In other embodiments, the inked image layer 430 may be printed directly onto the base film layer 410 without the first separate adhesive layer 420. The top film layer 450 with the second separate adhesive layer 440 may then be bonded to base film layer 410 and the inked image layer 430.

Figure 5:
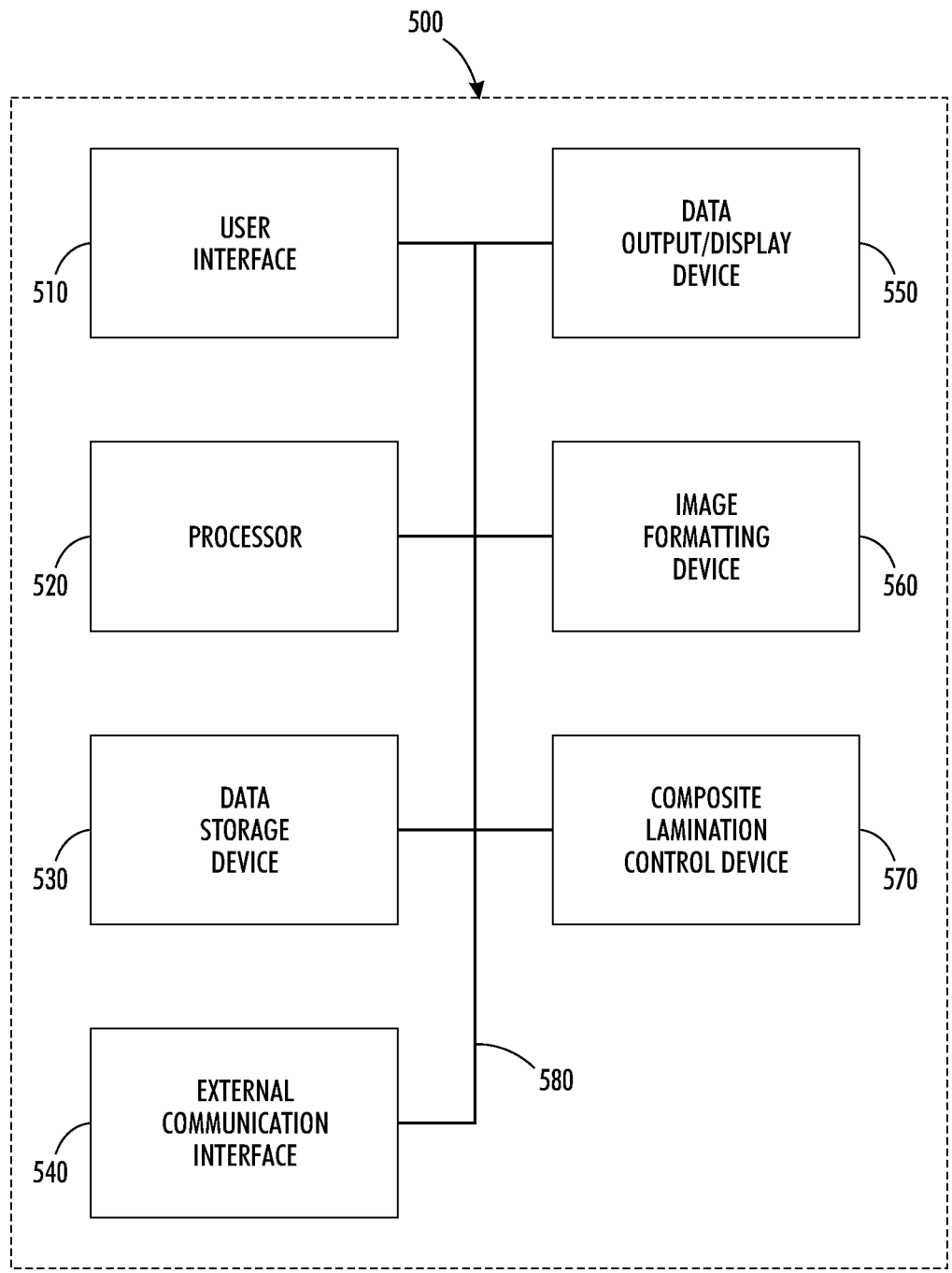
FIG. 5 illustrates a block diagram of an exemplary system for producing a laminated structure usable in a tamper-evident tape, wrap, label, mark or seal according to this disclosure.

FIG. 5 illustrates a block diagram of an exemplary system 500 for directing the production of a laminated structure usable in a tamper-evident tape, wrap, label, mark or seal. The components of exemplary system 500 shown in FIG. 5 may be embodied in an image forming device or a laminating device.

The exemplary system 500 may include a user interface 510 by which the user may communicate with the exemplary system 500. The user interface 510 may be configured as one or more conventional mechanisms common to typical computing devices and user workstations, or may, in combination with the data output/display device 550, constitute a graphical user interface, for example, in an image forming device or a laminating device. The user interface 510 may permit a user to input information to the exemplary system 500 in order to facilitate the process of configuring a laminated structure for encapsulating a non-aqueous solid ink image in a plurality of film layers in the manner disclosed. The user interface 510 may include, for example, a keyboard, a pointing device, a touchscreen with "soft" buttons, various components for use with a compatible stylus, a microphone by which a user may provide oral commands to the exemplary system 500 to be "translated" by a voice recognition program or otherwise, or other like device for user interaction with the components of the exemplary system 500.

The exemplary system 500 may include one or more local processors 520 for individually operating the exemplary system 500 and for carrying out the disclosed image forming and composite laminated structure forming processes. Processor(s) 520 may include at least one conventional processor or microprocessor that interprets and executes instructions to direct specific applications and functions with regard to image forming and composite laminated structure forming.

The exemplary system 500 may include one or more data storage devices 530. Such data storage device(s) 530 may be used to store data or operating programs to be used by the exemplary system 500, and specifically the processor(s) 520. Data storage device(s) 530 may be used to provide information regarding image forming, including image formatting, and composite laminated structure forming using the formatted inked images. Data storage device(s) 530 may include a random access memory (RAM) or another type of dynamic storage device that is capable of storing collected information, and separately storing instructions for execution of system operations by, for example, processor(s) 520. Data storage device(s) 530 may also include a read-only memory (ROM), which may include a conventional ROM device or another type of static storage device that stores static information and instructions for processor(s) 520. Further, the data storage device(s) 530 may be integral to the exemplary system 500, or may be provided external to, and in wired or wireless communication with, the exemplary system 500, including being hosted in the cloud.

The exemplary system 500 may include one or more external data communication interfaces 540 by which the exemplary system 500 may communicate with components external to the exemplary system 500, such as an image forming device for depositing imaging materials on film layer substrates, or other components of a lamination system for processing composite laminated structures, which may include the application of heat and/or pressure in the laminating process. The one or more external data communication interfaces 540 may be specifically configured, as appropriate, to communicate with individual external components and/or devices.

The exemplary system 500 may include at least one data output/display device 550 that may be configured as one or more conventional mechanisms, such as a display screen, that outputs information to a user to aid the user in directing image forming and composite laminated structure processing with the exemplary system 500.

The exemplary system 500 may include an image formatting device 560 by which a user can format an encapsulated image to be disposed on a film layer. The image formatting device 560 may format the image based on user inputs received via a user interface 510. Alternatively, the image formatting device 560 may format the image based on information identifying the packaging to which the composite laminated structure may be attached as a tamper-evident marking. The packaging information may be retrieved from a data storage device 530 and the image formatting device 560 may use the information to format an image that may be coordinated with an underlying image of the packaging.

The exemplary system 500 may include a composite lamination control device 570 that provides instructions to various components, including, for example, a heat and/or pressure device that may be included to facilitate processing of a laminated structure according to the disclosed methods.

All of the various components of the exemplary system 500, as depicted in FIG. 5, may be connected by one or more data/control busses 580. These data/control bus(ses) 580 may provide wired or wireless communication between the various components of the exemplary system 500, whether all of those components are housed integrally together as a single unit, or are otherwise external, and connected, to a single integral unit as part of the exemplary system 500. It should be appreciated that, although depicted in FIG. 5 as an integral unit, the various disclosed elements of the exemplary system 500 may be arranged in any combination of sub-systems as individual components or combinations of components, integral to a single unit, or external to, and in wired or wireless communication with, the single unit of the exemplary system 500. In other words, no specific configuration, as an integral unit or as a support unit, is to be implied by the depiction in FIG. 5. Further, although depicted as individual units for ease of understanding of the details provided in this disclosure regarding the exemplary system 500, it should be understood that the described functions of any of the individually-depicted components may be undertaken, for example, by one or more processors 520 connected to, and in communication with, one or more data storage devices 530.

Figure 6:
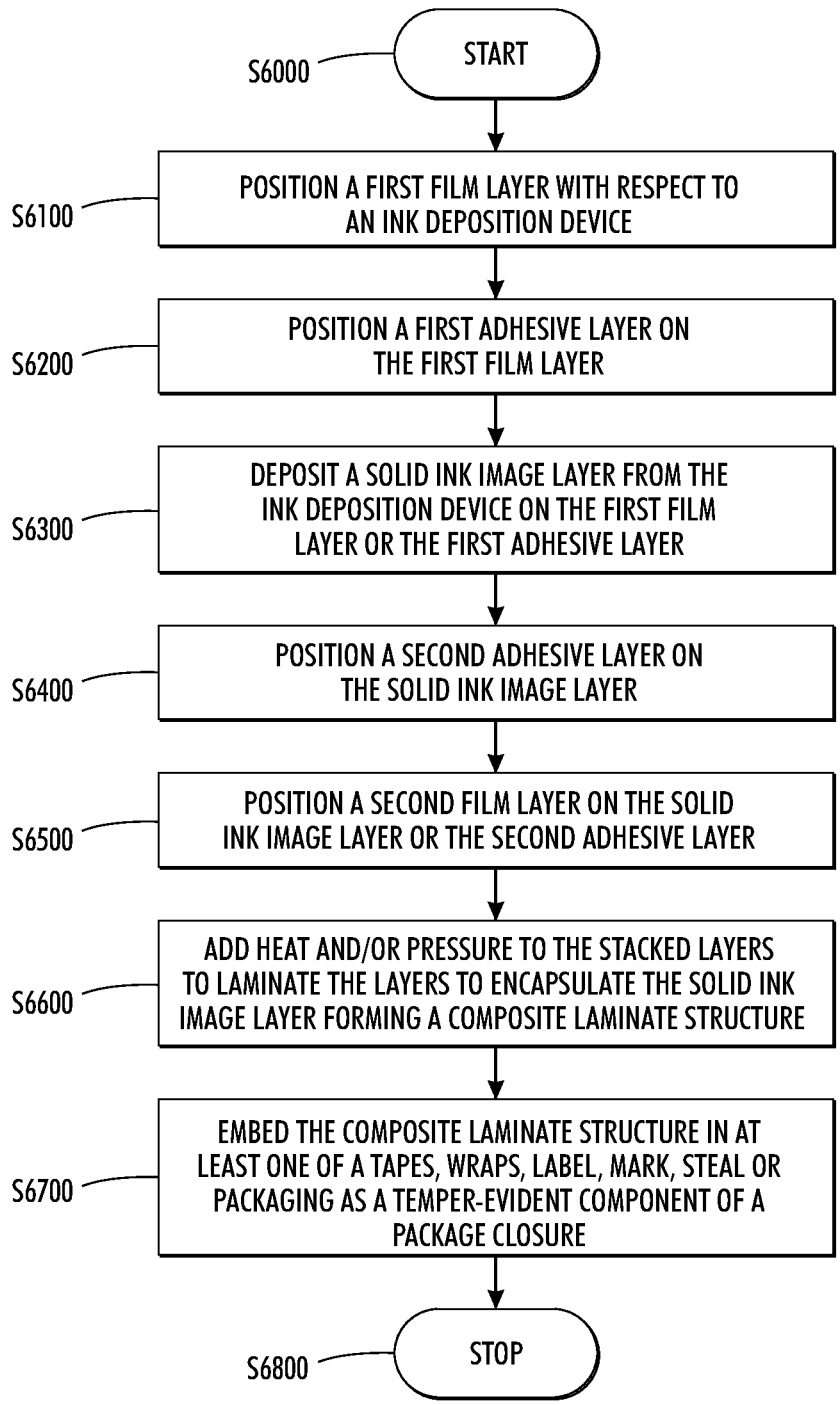
FIG. 6 illustrates a flowchart of an exemplary method for producing a laminated structure usable in a tamper-evident tape, wrap, label, mark or seal according to this disclosure.

FIG. 6 illustrates a flowchart of an exemplary method for producing a laminated structure usable in a tamper-evident tape, wrap, label, mark or seal according to this disclosure. As shown in FIG. 6, operation of the method commences at Step S6000 and proceeds to Step S6100.

In Step S6100, a first or base film layer may be positioned with respect to an ink deposition device that is usable to form non-aqueous solid ink images on the first or base film layer as an imaging substrate. Operation of the method proceeds to Step S6200.

In Step S6200, a first adhesive layer may be positioned on the first or base film layer. The positioning of the first adhesive layer may include positioning of a separate adhesive layer, or otherwise, may include coating the first or base film layer with an adhesive product. The adhesive layer may include an adhesive component, which may or may not be heat activated to facilitate the lamination of the composite laminated structure and adherence between individual layers. Operation of the method proceeds to Step S6300.

In Step S6300, a solid ink image may be deposited on the first or base film layer in instances when a first adhesive layer is not deposited on the first or base film layer, or otherwise deposited on the adhesive covered first or base film layer. The solid ink image may be constituted of non-aqueous ink deposited on the first or base film layer using an ink jet process, including a modified super-fine ink jet device. The solid ink image may be formatted according to virtually any design, including a design that may correspond to, or coordinate with, labeling on a packaging for a product on which the final composite laminated structure produced according to this method is intended to be placed as a tamper-evident tape, wrap, label, mark or seal. Operation of the method proceeds to Step S6400.

In Step S6400, a second adhesive layer may be positioned on the solid ink image layer or on a second film layer. The second adhesive layer may be constituted of an adhesive layer or an adhesive coating the same as, similar to, or different from, the first adhesive layer. Operation of the method proceeds to Step S6500.

In Step S6500, a second or top film layer may be positioned on the first or base layer and the solid ink image layer. The second or top film layer may be composed of a same material or a different material than the material that forms the first or base layer. Operation of the method proceeds to Step S6600.

In Step S6600, heat and/or pressure may be applied to the stacked layers to laminate the stacked layers into a composite laminated structure that encapsulates the solid ink image layer. The adhesives, or adhesive layers, between the base and top film layers may be heat activated in the process of laminating the structure to encapsulate the solid ink image layer. Operation of the method proceeds to Step S6700.

In Step S6700, a finished composite laminated structure formed according to the steps of this method may be embedded in at least one of a tape, wrap, label, mark, seal or packaging to form a tamper-evident component of a package closure. Operation of the method proceeds to Step S6800, where operation of the method ceases.

The above-described exemplary systems and methods reference certain conventional components to provide a brief, general description of suitable image forming devices and laminating methods that may be particularly adaptable to producing the composite laminated structures according to the described systems and methods. Those skilled in the art will appreciate that other embodiments of the disclosed subject matter may be practiced with many types of image forming devices, laminated layers, adhesives and laminating devices, for example, in many different configurations.

The exemplary depicted sequence of executable instructions described in the above method represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 6, and the accompanying description, except where a particular method step is a necessary precondition to execution of any other method step. Individual method steps may be carried out in sequence or in parallel, in simultaneous or near simultaneous timing, as appropriate.

Although the above description may contain specific details, they should not be construed as limiting the claims in any way. Other configurations of the described embodiments of the disclosed systems and methods are part of the scope of this disclosure.

It will be appreciated that a variety of the above-disclosed and colorably-related features and functions, or alternatives thereof, may be desirably combined into many related different systems or applications. Various alternatives, modifications, variations, or improvements therein may be subsequently made by those skilled in the art, which are also intended to be encompassed by the following claims.

What is claimed is:

1. A system for producing a tamper-evident mark for product packaging, comprising:
an image formatting device that directs deposition of a solid ink image onto a portion of an imaging substrate, the imaging substrate comprising at least one of a plastic or paper material;
wherein a data storage device stores information regarding a packaging on which the tamper-evident mark is to be disposed, the image formatting device acquiring from the data storage device the stored information regarding the packaging, and formatting the solid ink image such that the tamper-evident mark corresponds to a portion of an image on the packaging;
a lamination control device coupled to a processor, to the image formatting device, and to the data storage device, wherein the data storage device having instructions operative on the processor to produce a laminated structure with a high gloss finish from stacked layers of film, ink, and optional adhesives by:
positioning a first or base film layer in the image formatting device that is usable to form non-aqueous solid ink images on the first or base film layer as the imaging substrate;
optionally applying a first adhesive layer on the first or base film layer, wherein the first adhesive layer may include positioning of a separate adhesive layer, or otherwise, may include coating the first or base film layer with an adhesive product;
depositing a solid ink image layer on the first or base film layer or otherwise deposited on the adhesive covered first or base film layer, wherein an image is multi-colored pictorial, textual, or both images of any design;
optionally applying a second film layer on the deposited solid ink image layer;
optionally applying a second adhesive layer on the deposited solid ink image layer or on the second film layer;
positioning a second or top film layer on the first or base layer and the deposited solid ink image layer;
applying heat, pressure, or both to the stacked layers to laminate the stacked layers into a composite laminated structure that encapsulates the solid ink image layer;
wherein application of torsional stress on the laminated structure creates a fracture at the solid ink image layer causing a greying of the solid ink image to indicate tampering.

2. The system of claim 1, wherein the solid ink image being deposited on the portion of the imaging substrate using a super-fine ink jet process that jets solid ink from at least one ink jet nozzle in a direct-to-film process or a transfer process.

3. The system of claim 1, wherein the imaging substrate and the second or top film layer being a flexible packaging material composed of a bi-axially oriented polypropylene material.

4. The system of claim 1, wherein the imaging substrate and the second or top film layer having an adhesive applied to at least a portion of the surface that faces the other of the imaging substrate and the second or top film layer, the adhesive comprising at least one of (1) a heat activated adhesive compound coated on the substrate and the covering film and (2) a separate heat activated adhesive layer interposed between the imaging substrate and the solid ink image and the solid ink image and the second or top film layer.

* * * * *